United States Patent [19]
Strehlow

[11] 3,812,889
[45] May 28, 1974

[54] DUST CONTROL SYSTEM UTILIZING TEMPORARILY STORED AGGREGATES

[75] Inventor: Robert W. Strehlow, New Berlin, Wis.

[73] Assignee: Rexnord Inc., Milwaukee, Wis.

[22] Filed: Aug. 14, 1972

[21] Appl. No.: 280,401

[52] U.S. Cl........................ 141/93, 55/473, 55/476, 55/524, 98/115 R, 302/59
[51] Int. Cl................................................ B65b 1/28
[58] Field of Search.................................... 53/167; 55/338–340, 429–431, 467, 473, 476, 524; 73/73; 98/115 R; 141/83, 85, 93–95, 286; 222/64, 65; 302/22, 59

[56] References Cited
UNITED STATES PATENTS

| | | | |
|---|---|---|---|
| 2,671,102 | 3/1954 | Jewell | 302/59 |
| 2,684,869 | 7/1954 | Lapple | 302/59 |
| 3,066,462 | 12/1962 | Yap et al. | 55/524 X |
| 3,517,549 | 6/1970 | Teich | 73/73 |
| 3,536,925 | 10/1970 | Schmidt | 222/65 X |
| 3,707,172 | 12/1972 | Obara | 141/93 X |
| 3,739,893 | 1/1972 | Kaufmann | 141/93 X |
| 3,722,397 | 3/1973 | Kempthorne | 98/115 R |

Primary Examiner—Houston S. Bell, Jr.
Assistant Examiner—Frederick R. Schmidt

[57] ABSTRACT

A concrete batch plant is provided with a subatmospheric air carried dust collection system which discharges under positive pressure into the body of the aggregates being processed through the plant. This aggregate body functions as a continuously renewed filter bed.

6 Claims, 4 Drawing Figures

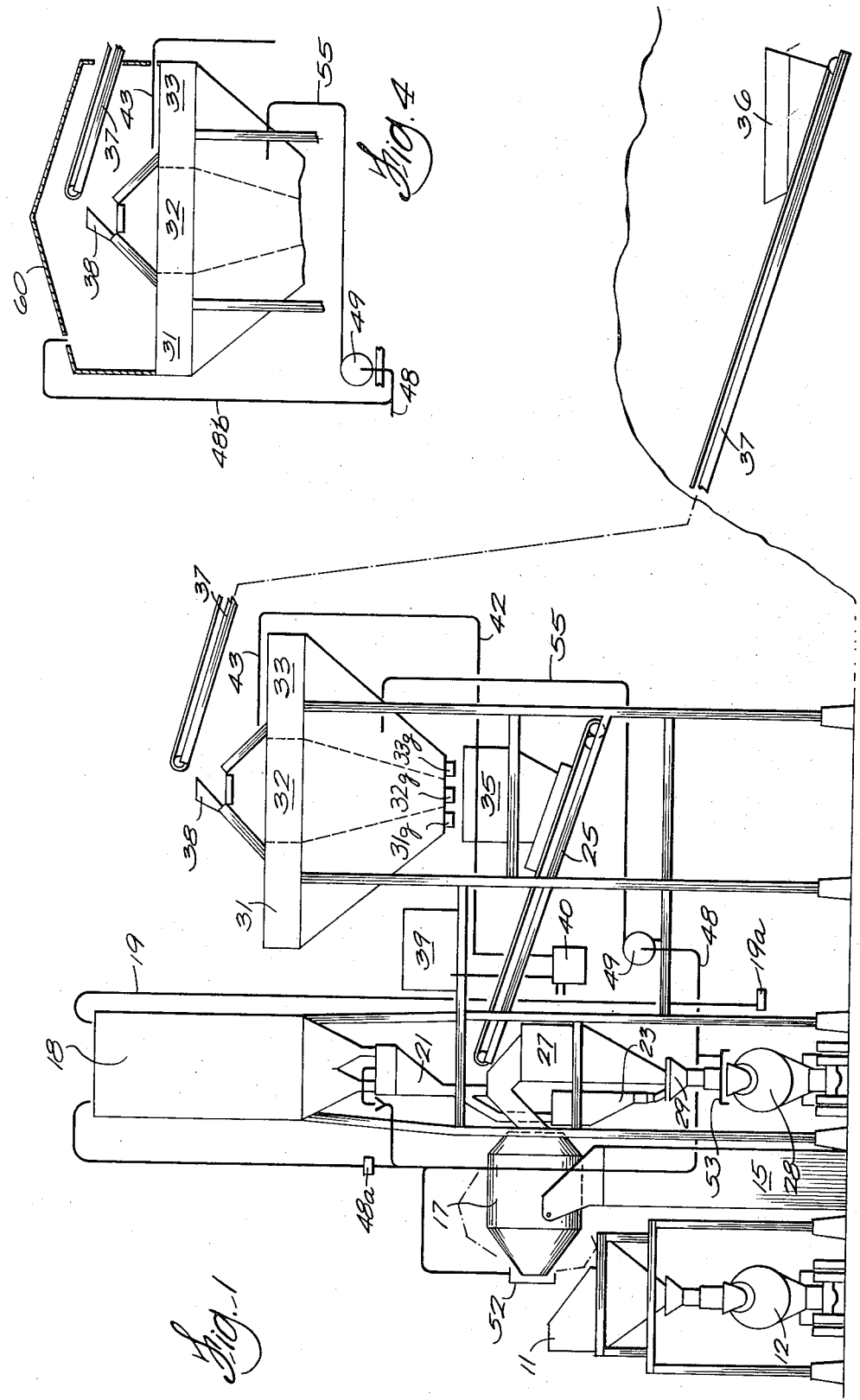

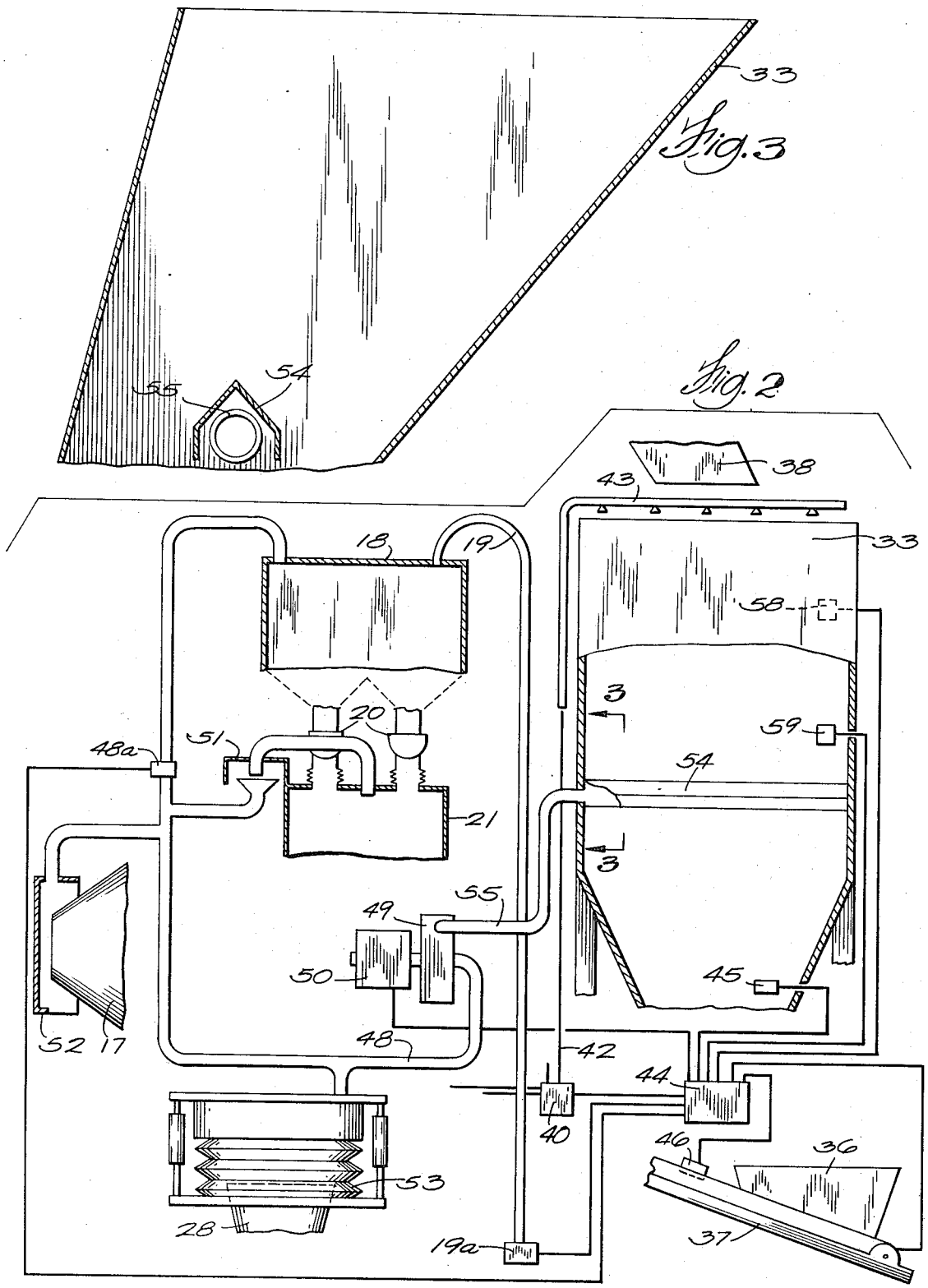

DUST CONTROL SYSTEM UTILIZING TEMPORARILY STORED AGGREGATES

BACKGROUND OF THE INVENTION

Field of the Invention

The present invention relates to filtering media for the removal of solids from gases.

Background of the Invention

The removal of dust from air passing into the atmosphere has not been a general problem until recently. In the construction of roadways and buildings of concrete, the batching of the cement and aggregates and their discharge into the mixer is carried out with equipment which is frequently moved from place to place. The development of dust control equipment for this type of operation and which is relatively simple and similarly movable from location to location led to the development of the present invention.

It is estimated that five pounds of dust emanates from an ordinary plant with each 4,000 cu. yds. of mixed concrete produced by the plant. To a nearby resident, this is considerable; to an observer it appears as occasional puffs of smoke and over a long period, some settled fines in the very immediate area of the plant. To date, an effective dust control system has been highly desirable but impracticable.

SUMMARY OF THE INVENTION

The present invention is based upon the thought that the collected dust is essentially only the fines from one of the process materials and that the aggregates, or at least one of them which is constantly moving through the bin, might serve as a continuous filter requiring no cleaning if the dust is essentially only being returned to the process.

The dust control system of the present invention may thus be used in conjunction with any process where a given quantity of a dry, inert, granular or bulk material is stored in a bin and is regularly withdrawn from one location in the bin and replenished at an opposite location. The invention utilizes this temporarily stored material as a filter bed for removing dust which may be carried by from air which is to be allowed to escape to the atmosphere, or from any gas from which removal is desirable and which does not react with the material. Insofar as is known, the basic requirements in the use of the invention are that the bulk material be particulate and air-pervious meaning that as stored in the bin the material has voids allowing the passage of air through the material, that the bulk material may be moistened if it is too dry and that the process utilizing the material is not affected by or may be adjusted to accommodate the dust and moisture added to the process.

BRIEF DESCRIPTION OF THE DRAWINGS

FIG. 1 is a view showing the general arrangement of a concrete batch plant with a concrete mixer and hoppers for loading truck mixers with either mixed or unmixed concrete.

FIG. 2 is a diagram of the operating elements of the dust control system including the interrelated portions of the batch plant shown in FIG. 1.

FIG. 3 is a section taken on line 3 — 3 of FIG. 2.

FIG. 4 is a view showing the aggregate bin and blower of the batch plant shown in FIG. 1. The bin further includes a dust collection hood and the dust collection duct includes a branch connecting the blower with the hood.

DESCRIPTION OF THE PREFERRED EMBODIMENT

The concrete batch plant shown is a combined plant in that it includes both a truck-charging station for delivery of the concrete fully mixed and another for delivery of the weighed ingredients for mixing in transit.

The structure at the left supports the mixed cement receiving hopper 11 which is elevated to discharge directly into the delivery truck 12. The adjacent pedestal 15 supports the concrete mixer 17 which tilts to discharge the mixed concrete into hopper 11. The tall cement container 18 is filled pneumatically through the filler pipe 19 and discharges through lower gates 20 into the cement weigh hopper 21. The weighed cement is discharged either directly into the mixer 17 or into the lower holding bin 23. The weighed aggregate from conveyor 25 is similarly discharged either into mixer 17 or into the weighed aggregate holding bin 27.

The weighed cement and aggregate from bins 23 and 27 are discharged through the collecting hopper 29 which discharges into the truck mixer 28. The bins 31, 32 and 33 for the sand, fine and coarse stone are provided with separate gates 31g, 32g and 33g respectively and selectively discharge into the aggregate weigh hopper 35 which in turn discharges the weighed aggregate onto conveyor 25.

The loading hopper 36 of conveyor 37 is located near the aggregate storage piles as illustrated and the upper discharge end of conveyor 37 is located over the bins 31-33. The movable chute 38 directs the aggregate into the selected bin.

The elevated tank 39 carries the supply of water for the concrete mix as well as the supply of water needed for the dust control system of the present invention. The water supply controls of the plant are represented by the box 40 to which the water supply line from tank 39 is connected. Three water lines extend from box 40. One line delivers water to the charging opening of mixer 17; another line delivers water to hopper 29; the line 42 delivers water to the spray bar 43 extending over bin 33 as will be further described. The water supply controls 40 are connected to the control panel 44 which regulates the operation of the plant. The water lines to mixer 17 and hopper 29 and the controls represented by box 40 may be of any prior art type.

The dust collection system includes the dust collection duct 48 which is connected to the inlet end of the blower 49 driven by motor 50. The branches of duct 48 are connected to the dust trap 51 carried in part by the upper end of cement weigh hopper 21 to the hood 52 over the discharge end of mixer 17 and the retractable hood 53 at the discharge end of hopper 29. The uppermost branch of duct 48 is controlled by the valve 48a and is connected to the upper closed end of container 18.

The duct 55 from the outlet of blower 49 extends to one of bins 31-33, specifically here, bin 33 and opens into the bin just below the inverted horizontal channel or shield 54 having its ends secured to the opposite side walls of the bin. Shield 54 is of an inverted V-section so that the aggregate which moves downwardly through the bin can pass readily on either side of the shield. The cross section of shield 54 is such that a clear air space is maintained for entry of the air with dust from duct 55 and so that the air may pass upwardly through the aggregate and escape from the upper open end of the bin without the dust which is gathered by the aggregate.

As is known, the water content of concrete must be accurately regulated. The continuous operation of the dust collection system as described also affects the moisture content of the aggregate. Additionally it has found that the aggregate will quite usually be too dry to effectively trap the cement dust and prevent it from being blown upwardly from the bin. Additional water is therefore provided by the spray bar 43 which extends over bin 33 and is regulated by sensors 45 and 46. The moisture content of the aggregate leaving the bin is measured by the sensor 45 near the lower discharge end of the bin and with suitable control means is conventionally employed to adjust constantly the amount of water added to the mix entering mixer 17 or truck mixer 28. The second sensor 46 is located in the path of the aggregate carried by conveyor 37 and both sensors are connected to the control panel 44 of the plant which regulates the water supplies through controls 40 to maintain the desired water content of the mixed concrete.

Maintenance of some amount of aggregate in bin 33 is also required and for that purpose the bin level sensors 58 and 59 are provided and operatively connected to control panel 44. When the aggregate in bin 33 is over the sensor 58 near the top of the bin, the control panel shuts down the drive motor of conveyor 37 to prevent overfilling. The additional sensor 59 is located some selected distance above shield 54 which corresponds with the minimum amount of aggregate in the bin required for filtering the dust from the air entering the aggregate. Sensor 59 is operatively connected to control panel 44 so that blower motor 50 is shut off while the aggregate level is below sensor 59.

When filler pipe 19 is used, the valve 48a must be closed and for that purpose, the hose line connection 19a at the lower end of pipe 19 and valve 48a are operatively connected to control panel 44 to close valve 48a when the pipe connection 19a is open. This allows the dust collection system to continue operating. Alternatively, and under emergency conditions, the blower motor 50 could instead be turned off.

The dust collection system including blower 49 may otherwise operate constantly while the plant is in normal operation. However, the dust is only discharged into the system intermittently as when mixer 17 or truck mixer 28 is being charged or when cement container 18 or the cement weigh hopper 21 is being filled. Thus, suitable timing means or other controls may be provided in some plants to save power and so that air is not being blown through the aggregate unnecessarily.

In FIG. 4, the bins 31-33 are provided with the hood 60 into which the conveyor 37 extends. The branch 48b of the dust collection duct 48 is connected to hood 60 so that operation of blower 49 withdraws the air from hood 60 and the aggregate dust carried by the air is trapped by the aggregate itself in the bin 33.

The several aggregates which are stored separately in bins 31-33 are generally sand, a crushed stone or pea gravel and a coarse gravel or small stone. It is presently believed that the coarser aggregate with the greater voids for the passage of air should be stored in bin 33, that is, the aggregate which is used as the filter bed.

However, any of the aggregates including the sand may be used and any two or more of the aggregates might be used as the filter bed.

As has been noted, the use of the invention is not believed to be limited to concrete batch plants.

I claim:

1. In combination with apparatus having an opening from which dust laden air is discharged to the atmosphere and which includes a bin having a continuous supply of a semi-moist chemically inert, air-pervious particulate material and an outlet means for discharging for processing the said material in selected quantities up to a maximum quantity such that a given minimum level of material is generally maintained in the bin; dust control apparatus including said bin and the supply of material therein and further comprising an air blower and first and second conduits respectively connected to the inlet and outlet of said blower, said first conduit having its inlet end adjacent to said opening and said second conduit having its outlet opening in the bin below said minimum level such that said material is utilized as the filter bed for removal of said dust from the air which is discharged upwardly through said material and from the bin.

2. The system of claim 1 which further includes moisture detector means having a sensor in the path of the material entering the bin and water spray means in said bin and controlled by said detector means, said water spray means being adjustable to establish and maintain the material in the semi-moist condition which is required for causing the dust to adhere to the material.

3. The invention of claim 2 which includes a material sensor in said bin at said minimum level and which is connected to the outlet means to prevent discharge of material which would leave insufficient material above said second conduit opening into the bin.

4. In a batch plant for receiving and temporarily storing, weighing and dispensing the cement and aggregates to be mixed with water for making concrete and for discharging preselected amounts at a given location into receiving means for mixing, said plant including a container for the cement and an open bin having predetermined minimum level of aggregate maintained therein, said container and bin having lower gate-controlled discharge openings for discharging the respective ingredients into said receiving means preparatory to mixing, a dust collection system for the dust which normally emanates from the receiving means and comprising a hood at said location, a powered air blower, a first conduit connecting said hood and the inlet of said blower and a second conduit having one end connected to the outlet of said blower and extending into the aggregate bin and opening therein below the minimum level of the aggregate whereby the system utilizes the aggregate temporarily stored in the bin as a filter for removal of the particulates from the air drawn from the hood and which is discharged through said material and upwardly from the bin.

5. The plant of claim 4 which further includes an automatically controlled water supply and discharge means at the upper open end of the bin and which periodically moistens the aggregates at a rate which approximates the rate of evaporation of the moisture by the air such that the cement/water ratio of the mix is not varied by such moisture addition.

6. The invention of claim 4 wherein said system further includes bin level sensors which indicate the minimum level of the aggregate in the bin for the optimum operation of the system.

* * * * *